A. H. FETZER.
UNIVERSAL JOINT AND FOUR WHEEL DRIVE.
APPLICATION FILED APR. 4, 1908.
930,852.
Patented Aug. 10, 1909.
2 SHEETS—SHEET 1.
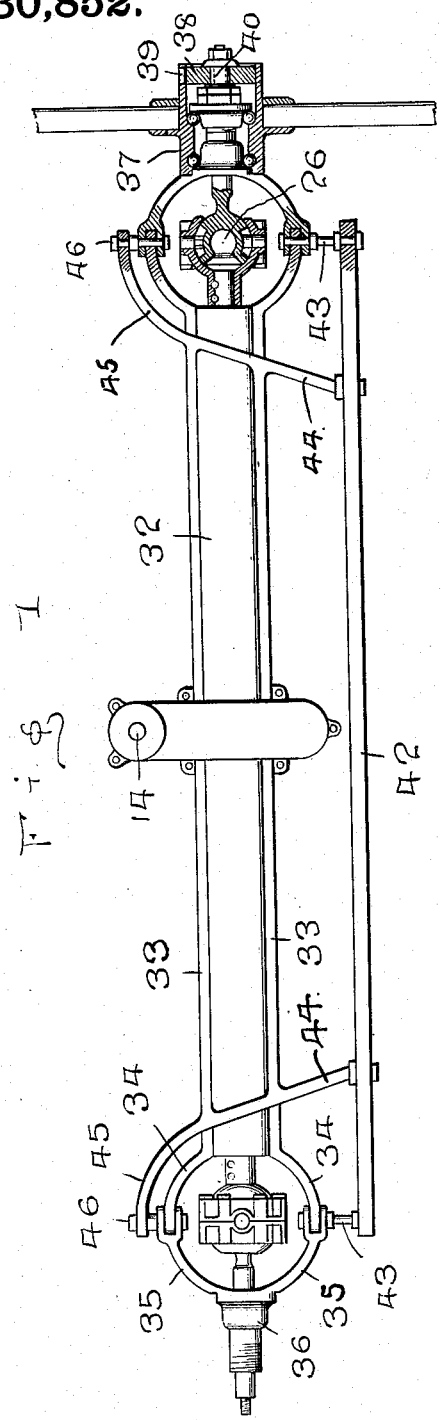
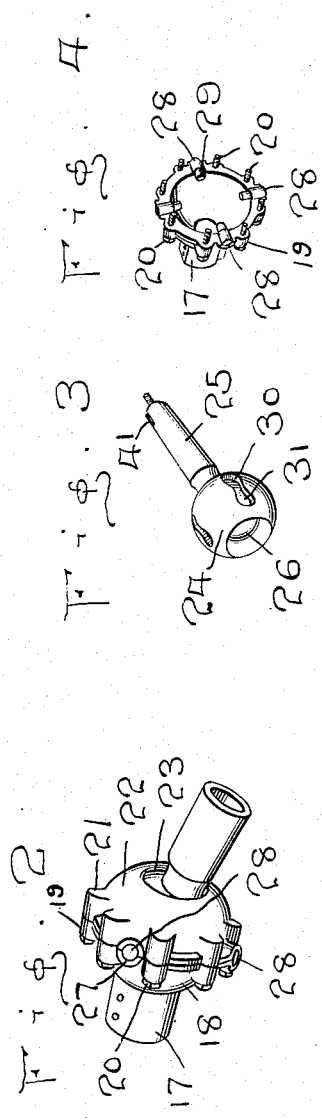
Inventor
A. H. Fetzer
Witnesses
Thos. W. Riley
W. P. Lawson
By
W. T. FitzGerald & Co.
Attorneys A. H. FETZER.
UNIVERSAL JOINT AND FOUR WHEEL DRIVE.
APPLICATION FILED APR. 4, 1908.

930,852.

Patented Aug. 10, 1909.
2 SHEETS—SHEET 2.

UNITED STATES PATENT OFFICE.

ALLEN H. FETZER, OF GALION, OHIO.

UNIVERSAL-JOINT AND FOUR-WHEEL DRIVE.

No. 930,852.  Specification of Letters Patent.  Patented Aug. 10, 1909.

Application filed April 4, 1908. Serial No. 425,152.

*To all whom it may concern:*

Be it known that I, ALLEN H. FETZER, a citizen of the United States, residing at Galion, in the county of Crawford and State of Ohio, have invented certain new and useful Improvements in Universal-Joint and Four-Wheel Drives; and I do hereby declare the following to be a full, clear, and exact description of the invention, such as will enable others skilled in the art to which it appertains to make and use the same.

This invention relates to new and useful improvements in steering mechanism for motor driven vehicles and has primarily for its object the provision of novel means whereby the wheels on a driven shaft may be turned in the direction desired without interfering with the rotation of the driven shaft.

It is also an object of the invention to provide a novel device of this character wherein wheels are mounted on stub shafts independently of the main portion of the shaft so that a turn may be effected without the necessity of turning the entire shaft.

It is also an object of the invention to provide a novel device of this character having means for effectually bracing the connection between the stub shaft and the main portion of the shaft.

It is also an object of the invention to provide a novel device of this character employing a universal joint, said universal joint consisting of a ball and socket suitably united.

It is also an object of the invention to employ in conjunction with a device of this character a novel socket, said socket consisting of two sections having interposed between their contacting faces a means for projecting within the concavities of the ball.

It is also an object of the invention to provide a novel device of this character that will be simple in construction, efficient and advantageous in practice and comparatively inexpensive to manufacture.

With the above and other objects in view the invention consists of the details of construction and in the novel arrangement and combination of parts to be hereinafter more particularly referred to.

Figure 5:
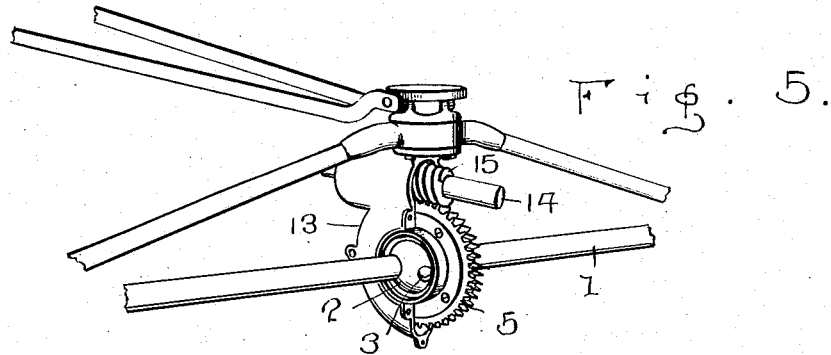
Figure 6:
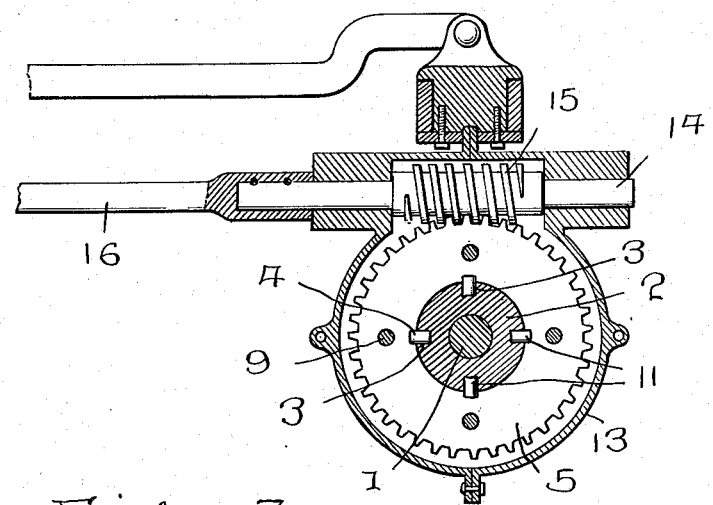
Figure 7:
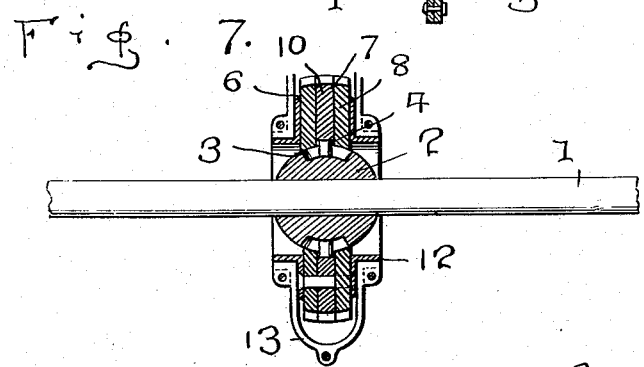

In describing the invention in detail reference will be had to the accompanying drawings forming part of this specification wherein like characters of reference denote corresponding parts in the several views, and in which, Figure 1 is a view partly in elevation and partly in section illustrating the invention. Fig. 2 is a view in perspective, detached of the ball and socket united. Fig. 3 is a view in perspective, detached of the ball and stub shaft secured thereto. Fig. 4 is a view in perspective of a section of the socket. Fig. 5 is a fragmentary view in perspective of the driving means for the shaft. Fig. 6 is an enlarged sectional view of Fig. 5 illustrating the details of the operating mechanism. Fig. 7 is a sectional view of Fig. 5 taken at right angles to the section in Fig. 6.

In the drawings 1 denotes a shaft of a motor driven vehicle, preferably the forward shaft having fixed to its longitudinal center a ball 2, the face of which is provided with a plurality of concavities 3, preferably four in number, in which are adapted to extend stems 4 carried by a sprocket 5. This sprocket 5 is formed preferably of three sections 6, 7 and 8 secured together by the transverse rivets 9 or other fastenings. Each of the sections 6, 7 and 8 is provided with a central opening registering one with the other, the walls of said openings being curved to form a concave face adapted to fit the periphery of the ball 2, the width of the sprocket when the sections are secured together being such that the outer edges of the concave face will prevent casual removal of the ball from the sprocket.

Projecting through the central sprocket 7 are stems 10 which extend within the central opening thereof and are adapted to pass within the concavities 3, there being a stem for each concavity.

In order to reduce friction between the stems and the walls of the concavities rollers 11 are mounted on the extended portions of the stems. The outer face of each of the sections 6 and 8 has secured thereto an annular flange 12 on which rests the casing 13 which is formed preferably of two sections. The upper portion of the casing 13 forms a bearing for a shaft 14, which is provided with a worm 15 meshing with the teeth of the gear wheel 5. A portion of this shaft projects rearwardly of the upper portion of the casing and has keyed thereon a driving shaft 16, which is operated by any suitable motor (not shown).

To each end of the shaft 1 is secured a collar 17 formed with a section 18 of a socket which has spaced on its outer edge perforated ears 19 through which project screws 20 adapted to engage threaded sockets 21 carried by a second socket section 22.

The sections 18 and 22 when assembled form a spherical chamber 23 in which is fitted a hollow ball 24 carried by a stub shaft 25. The ball 24 is hollow so that suitable lubricant can be placed within the chamber 26 to reduce the friction between the ball and the walls of the spherical chamber 23.

The opposed edges of the sections 18 and 22 at predetermined intervals are recessed to form sockets 27 for the reception of pins 28 which project within the spherical chamber 23. The projected portions of the pins have mounted thereon antifriction rollers 29. These rollers are adapted to contact with the walls 30 of cavities 31 formed in the ball 24.

In order to allow the stub shaft 25 to be swung forwardly and rearwardly to guide the vehicle the concavities 31 are disposed longitudinally of said stub shaft. The side walls of each of the concavities are convex, while the end walls are concave, as is fully shown in the drawings. By this arrangement it will be readily seen that the movement of the stub shaft 25, either forwardly or rearwardly will in no way interfere with the rotation thereof.

The shaft 1 is surrounded by the sleeve sections 32 which are secured at one end to the casing 13, hereinbefore referred to. The top and bottom of each section is provided with a bar 33 which terminates in a segmental portion 34 projecting beyond the end of the sleeve, and pivotally secured to the ends of the segmental portions 34 are segmental portions 35 of the spindle 36. The pivotal connections between the portions 34 and 35 are directly above and below the center of the socket and are provided to prevent any movement of the stub shaft except the forward and rearward movement, hereinbefore referred to.

Mounted on the spindle 36 is the hub 37 which is connected at its end portion through the medium of the plate 38 to the stub shaft 25, as is believed to be apparent, although it might be well to state that the disk 38 has lugs 39 extending within recesses in the hub, and that the bore of the disk 38 is provided with tongues 40 adapted to extend within recesses 41 in the outer end of the stub shaft.

In order to brace the pivotal connections between the segmental portions 34 and 35 an under brace bar 42 is employed, to which is secured the pivotal bolt 43 of the portions 34 and 35. This bar is held in its proper position with relation to the shaft by the arms 44, which are secured to the bars 33. Each of these arms 44 is arranged on an outward incline and terminates in a segmental portion 45 through which passes the pivotal bolt 46 of the upper segmental portions 34 and 35, as is believed to be apparent in Fig. 1.

It might be well to state that the portions 34 and 35 form a hinged casing, while the universal joint is to drive the stub shaft 25.

The movement of the ball 2 on the shaft 1, hereinbefore referred to is not essential, as any ordinary driving means may be applied directly to the shaft 1, but this arrangement is shown to allow a center turn of the shaft should the necessities of practice so require, ordinarily, however, only the stub shafts 25 are turned.

As the mechanism for causing the stub shafts 25 to swing forms no part of the present invention the same is not shown, it being a well known or obvious expedient.

What I claim is:—

1. In combination with a driven shaft, stub shafts secured thereto by universal joints, a spindle on each stub shaft, each spindle having a pair of hinge sections, a two-section sleeve embracing the driven shaft, a bar on opposite sides of each sleeve section, said bars terminating in hinge sections adapted to coöperate with the hinge sections on the spindles, a bar positioned beneath the driven shaft, said bar being secured to certain pins of the hinge sections and arms projecting upwardly from the bar at an angle and having their upper ends curved and engaging the remainder of the pins of the hinge sections, said arms engaging the sleeve intermediate their length.

2. In combination with a driven shaft, stub shafts secured thereto by universal joints, a spindle on each of said stub shafts, each spindle having a pair of hinge sections bifurcated at their free ends, a driving gear adjacent the longitudinal center of said shaft, adapted to drive the shaft, a casing surrounding said gear, sleeve sections secured to opposite sides of the casing and surrounding said shaft, a pair of bars secured to each section of the sleeve and on diametrically opposite sides thereof, said bars terminating in hinge sections, the free ends of which are adapted to engage the bifurcated ends of the hinge sections on the spindles, pins adapted to pivotally connect the hinge sections together, a bar positioned beneath the driven shaft, the ends of said bar being secured to the pins of the downwardly extending hinge sections and inclined arms projecting upwardly from said bar and having their upper ends curved and engaging the pivot pins of the upwardly extending hinge sections.

In testimony whereof I have signed my name to this specification in the presence of two subscribing witnesses.

ALLEN H. FETZER.

Witnesses:
H. R. SCHULER,
HAZEL MAINS.